United States Patent [19]

Huber

[11] Patent Number: 4,497,752
[45] Date of Patent: Feb. 5, 1985

[54] X-SHAPED PACKING LAYERS AND METHOD OF MAKING

[75] Inventor: Max Huber, Winterthur, Switzerland

[73] Assignee: Sulzer Brothers Limited, Winterthur, Switzerland

[21] Appl. No.: 396,720

[22] Filed: Jul. 9, 1982

[30] Foreign Application Priority Data

Jul. 30, 1981 [CH] Switzerland .......................... 4926/81

[51] Int. Cl.³ .............................................. B01F 3/04
[52] U.S. Cl. ................................ 261/95; 29/163.5 R; 55/240; 165/60; 261/112; 261/DIG. 72; 264/285; 366/337; 428/181; 428/597
[58] Field of Search ...................... 261/94-98, 261/112, 113, 108, DIG. 72; 55/90, 233, 240, 241; 210/150; 202/158; 422/310; 428/176, 597, 181-185, 604; 29/157.3 D, 163.5 R; D23/3, 4; 165/166, 60; 366/336, 337, 338, 340; 264/249, 286, 285, 287, 505, 544, 545

[56] References Cited

U.S. PATENT DOCUMENTS

| 2,783,982 | 3/1957 | Kahl .................. 261/112 X |
| 3,006,436 | 10/1961 | Starbuck et al. ................. 261/95 X |
| 3,010,706 | 11/1961 | McWilliams .............. 261/DIG. 72 |
| 3,311,356 | 3/1967 | Eckert .................. 261/94 |
| 3,343,821 | 9/1967 | Winn et al. .......................... 261/112 |
| 3,591,351 | 7/1971 | Ullman ................. 428/597 |
| 3,801,419 | 4/1974 | Meek ................. 261/112 |
| 4,024,208 | 5/1977 | Wetteborn .......................... 261/112 |
| 4,034,965 | 7/1977 | King ................. 366/336 |
| 4,220,416 | 9/1980 | Brauner et al. ................. 366/337 |

FOREIGN PATENT DOCUMENTS

| 2459355 | 7/1975 | Fed. Rep. of Germany ...... 366/338 |
| 2942481 | 4/1981 | Fed. Rep. of Germany ... 261/DIG. 72 |
| 2311578 | 12/1976 | France ................. 261/94 |

Primary Examiner—Richard L. Chiesa
Attorney, Agent, or Firm—Kenyon and Kenyon

[57] ABSTRACT

The packing can be used for mixing or for exchange processes in exchange columns. The packing comprises at least one group of layers perpendicular to the column axis which has deflecting surfaces connected to a central connecting bridge and which are bent outwardly of the bridge in alternating fashion to define a X-shape. The adjacent layers can be provided with outer bridges which are bent around to form hook-shape portions for engaging about an adjacent layer.

The packing can be produced by simple stamping and bending steps.

6 Claims, 10 Drawing Figures

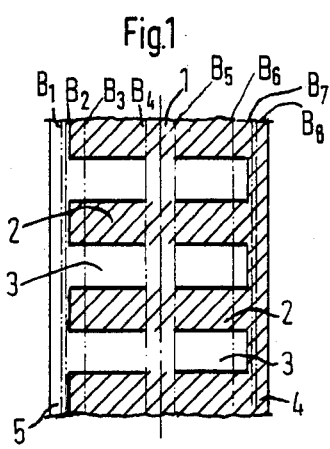
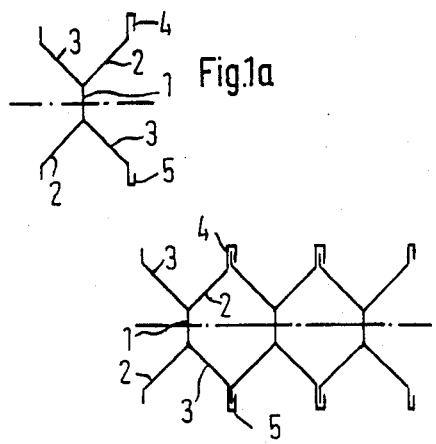
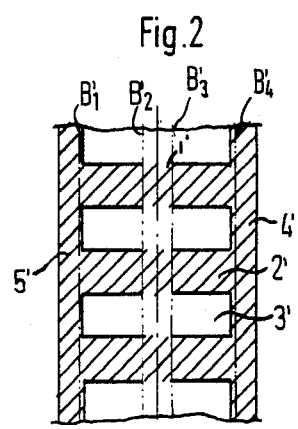
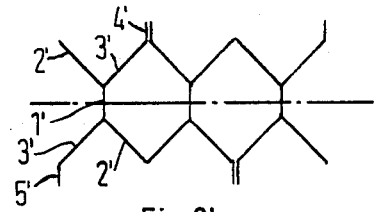
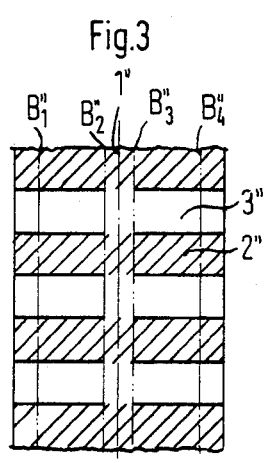
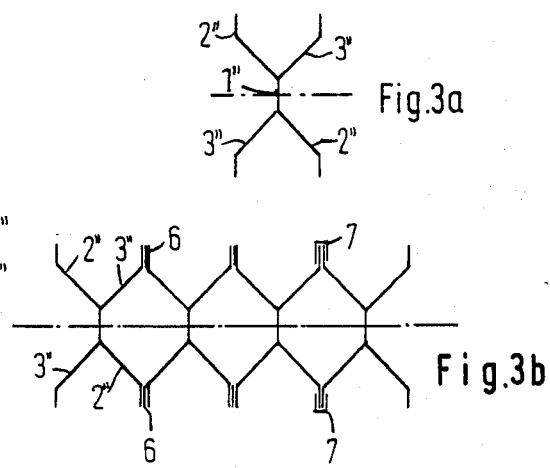

X-SHAPED PACKING LAYERS AND METHOD OF MAKING

This invention relates to a packing made of X-shaped layers and a process of making the packing.

Heretofore, various types of packings have been known for use in mass transfer, direct heat exchange and mixing. For example, various types of packings have been used in static mixers such as described in U.S. Pat. Nos. 4,062,524 and 4,220,416. The function of the packings in these mixers is to provide a homogeneous mixing of two or more concurrent flows, that is, to insure good mixing of the end product over the whole flow cross-section at all quantity and viscosity ratios of the components required to be mixed.

When used in mass transfer processes, particularly, for rectification, the packings are flowed through in countercurrent by the phases concerned in the mass transfer. In this case, the various surfaces of the packings serve as support surfaces for a liquid phase which trickles down as a film under gravity and with which, in the case of a gas-liquid process, a gas phase filling up the various gaps in the packing in counter-current to the liquid phase is brought into surface contact or with which, in the case of extraction columns, a second liquid phase is brought into surface contact.

However, the various packings have been constructed in manners which are very expensive, particularly in view of the wide range of diameters required for such packings. For example, U.S. Pat. No. 4,062,524 describes packings which are formed of comb-like plates which are pushed together in the shape of a cross. U.S. Pat. No. 4,220,416 describes packings which consist of joined-together discrete elements in the form of "Spanish riders". In each case, the packings require special stamping tools for each diameter.

Accordingly, it is an object of the invention to provide a packing which is simple and inexpensive to produce for any required diameter.

It is another object of the invention to provide a packing element which can be made in a relatively simple manner for use in constructing a packing for different column diameter.

Briefly, the invention provides a packing which is comprised of a number of layers each of which defines a generally X-shaped profile. Each layer has a centrally disposed bridge with a first row of deflecting surfaces which extend from one side of the bridge in alternating angular relation and a second row of deflecting surfaces which extend from an opposite side of the bridge in alternating angular relation.

Each layer can be made from a flat one-piece body, for example of sheet metal, in which the deflecting surfaces can be stamped out and subsequently bent to form an X-shape. Alternatively, the packing layer can be formed of plastics, for example by injection molding.

When forming a packing, for example, several layers are disposed in horizontal overlying relation in order to define a plurality of open-ended crossing flow channels. In addition, a plurality of strips can be used to connect the adjacent layers together, for example along the ends of the alternating deflecting surfaces.

These and other objects and advantages of the invention will become more apparent from the following detailed description taken in conjunction with the accompanying drawings wherein:

FIG. 1 illustrates a plan view of a part of a one-piece body for forming a packing layer in accordance with the invention;

FIG. 1a illustrates a side view of a packing layer formed in accordance with the invention;

FIG. 1b illustrates a side view of a packing formed of a plurality of layers in accordance with the invention;

FIG. 2 illustrates a plan view of a modified body for forming a packing in accordance with the invention;

FIG. 2a illustrates a side view of a packing layer formed of the body of FIG. 2;

FIG. 2b illustrates a side view of a packing formed of a plurality of layers constructed in accordance with FIG. 2a;

FIG. 3 illustrates a further modified body for forming a packing layer in accordance with the invention;

FIG. 3a illustrates a side view of a packing layer constructed from the body of FIG. 3;

FIG. 3b illustrates a plurality of packing layers similar to FIG. 3a joined together by various connecting strips.

Figure 4:
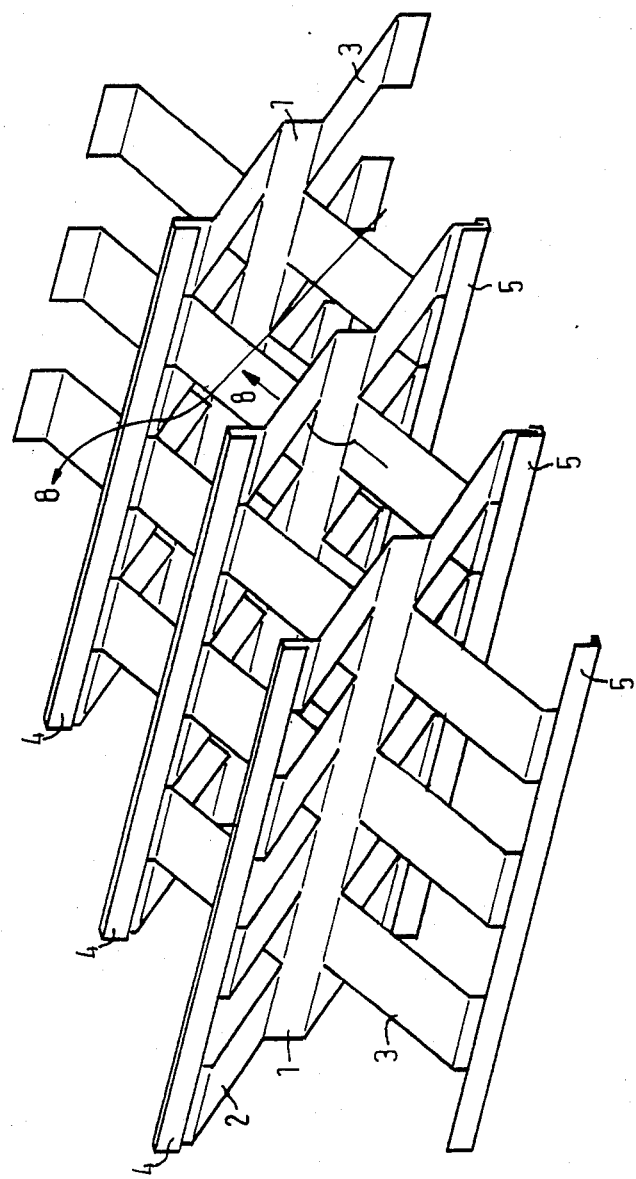
FIG. 4 illustrates a packing constructed of a plurality of X-shaped layers in accordance with the invention.

Referring to FIG. 1, a flat one-piece body 1, for example of sheet metal, is formed with a centrally disposed longitudinal bridge 1 and two rows of discrete deflecting surfaces 2, 3 which extend from opposite sides of the bridge 1. These deflecting surfaces 2, 3 can be stamped out of the body 1 in any suitable manner. As indicated, the body in FIG. 1 also has a pair of longitudinal bridges 4, 5 which are spaced from the central bridge 1 and which are each connected to alternating deflecting elements 2, 3. For example, the bridge 4 is integral with the deflecting surfaces 2 of one row whereas the bridge 5 is integral with the deflecting surfaces 3 of the other row. For the sake of clarity, the deflecting surfaces 2 are shown with hatching.

The sheet metal body in FIG. 1 is formed so as to be bent along eight bending lines $B_1$–$B_8$. After forming the stamped body, the alternating deflecting surfaces 2, 3 in each row are each bent relative to the central bridge 1 in order to define a generally X-shaped profile wherein the deflecting surfaces 2, 3 form an angle of, for example, 90°. To this end, the deflecting surfaces 2, 3 are bent about the bending lines $B_4$, $B_5$. In addition, the deflecting surfaces 2, 3 are bent near the outer ends about the bending lines $B_3$ $B_6$ so as to form portions which are parallel to the connecting bridge 1 (see FIG. 1a). Further, the connecting bridges 4, 5 are each bent into a hook-shaped fashion (see FIG. 1a) about the bending lines $B_1$, $B_2$; $B_7$, $B_8$. As such, the hook-shaped ends may be disposed around the flat end portions of the deflecting surfaces 3, 2 of an adjacent layer as indicated in FIG. 1b.

As indicated in FIG. 1b, a plurality of bent layers can be grouped together.

Referring to FIG. 2, wherein like reference characters indicate like parts as above, a flat one piece body may be constructed such that the deflecting surfaces 2' are interconnected not only to the central bridge 1' but also to the outer bridges 4',5' whereas the deflecting surfaces 3' are connected only to the central bridge 1'. In such a case, the outer bridges 4', 5' can be of different widths.

The body in FIG. 2 is bent about four bending lines $B'_1$–$B'_4$. As indicated, the bending lines $B'_2$ and $B'_3$ are coincident with the edges of the central connecting bridge 1'. This permits the deflecting surfaces 2', 3' to be bent outwardly so as to define a X-shape (see FIG. 2a). In addition, the outer connecting bridges 5',4' are bent out along the bending lines B'$_1$, B'$_4$ so as to be parallel to the connecting bridge 1'. A plurality of such bent layers are then placed together, for example as shown in FIG. 2b such that the outer connecting bridges contact one another when placed in contiguous end-to-end relationship. In this position, the respective layers can be interconnected via the bridges 4', 5', for example, by spot welding.

Referring to FIG. 3, wherein like reference characters indicate like parts as above, the flat one-piece body may be formed with only a centrally disposed longitudinal bridge 1" and two rows of discrete reflecting surfaces 2", 3". As above, the deflecting surfaces 2", 3" are bent out along the bending lines B"$_2$, B"$_3$ to form a X-shape (see FIG. 3a). In addition, the ends of the respective deflecting surfaces 2", 3" are bent out along the bending lines B"$_1$, B"$_4$ in parallel to the central bridge 1" so as to present flat flanges. Thus, when a plurality of layers are placed in contiguous end-to-end relation (see FIG. 3b), the adjacent end members can be interconnected by inserted strips 6 or surrounding strips 7. The end members and strips 6, 7 may also be interconnected, for example by a spot welding.

Referring to FIG. 4, in order to form a packing, a plurality of X-shaped layers are brought together at the outer longitudinal edges in contiguous relation to define a plurality of open-ended crossing flow channels 8. For example, the layers may be disposed side by side in parallel relation within a jacketed tube or column, or the like, such that the longitudinal axes of all of the layers are perpendicular to the tube axis. The packing is formed of a minimum of two, for instance of three X-shaped layers such as illustrated in FIG. 1a. In this case, the ends of the connecting bridges 4, 5 are placed in contiguous relationship with one another and are interconnected by bending around the extended ends of the deflecting elements 2, 3.

The layers for a packing may also be made of plastics material. In such a case, the layers may be injection molded into X-shaped layers.

The invention thus provides a packing which can be made in a relatively simple manner for use in mass transfer, mixing, rectification, and the like processes.

When placed in a column or other jacket like structure, the packings can be shaped to the contour of the interior of the column. In this respect, the axes of the layers are disposed in perpendicular relation to the direction of flow through the column.

What is claimed is:

1. A packing for a mass transfer, direct heat exchange and mixing comprising a plurality of X-shaped profiled layers disposed at the outer longitudinal edges thereof in side-by-side parallel relation with each other, each said layer having a centrally disposed bridge, a first row of deflecting surfaces extending from one side of said bridge in alternating angular relation and a second row of deflecting surfaces extending from an opposite side of said bridge in alternating angular relation.

2. A packing as set forth in claim 1 wherein each layer has a bridge spaced from said centrally disposed bridge and connected to alternating deflecting elements of said first row.

3. A packing as set forth in claim 2 wherein each layer has a second bridge spaced from said centrally disposed bridge and connected to alternating deflecting elements of said second row.

4. A packing a set forth in claim 1 wherein said layers are disposed in contiguous relation to define a plurality of open-ended crossing flow channels.

5. A packing as set forth in claim 1 which further comprises a plurality of strips connecting adjacent layers together along the ends of alternating deflecting surfaces.

6. A process of making a multi-layer packing comprising the steps of forming a plurality of flat sheet-like bodies each with a centrally disposed bridge, a first row of discrete deflecting surfaces extending from one side of said bridge and a second row of discrete deflecting surfaces extending from an opposite side of said bridge;

bending alternating deflecting surfaces in each said row of each body relative to said respective bridge to define generally X-shaped profiles; and disposing said profiles at the outer longitudinal edges thereof in contiguous side-by-side parallel relation to define a plurality of open-ended crossing flow channels.

* * * * *